(12) United States Patent
Mayukh et al.

(10) Patent No.: US 11,906,802 B2
(45) Date of Patent: Feb. 20, 2024

(54) PHOTONICS INTEGRATION IN SEMICONDUCTOR PACKAGES

(71) Applicant: Avago Technologies International Sales Pte. Limited, Singapore (SG)

(72) Inventors: Mayank Mayukh, Fort Collins, CO (US); Sam Zhao, Irvine, CA (US); Sam Karikalan, Ladera Ranch, CA (US); Reza Sharifi, Irvine, CA (US); Liming Tsau, Irvine, CA (US); Arun Ramakrishnan, Lake Forest, CA (US); Dharmendra Saraswat, Foothill Ranch, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 17/741,349

(22) Filed: May 10, 2022

(65) Prior Publication Data

US 2023/0367087 A1    Nov. 16, 2023

(51) Int. Cl.
G02B 6/42      (2006.01)
G02B 6/43      (2006.01)

(52) U.S. Cl.
CPC .............. *G02B 6/43* (2013.01); *G02B 6/4204* (2013.01); *G02B 6/4293* (2013.01)

(58) Field of Classification Search
None
See application file for complete search history.

(56) References Cited

U.S. PATENT DOCUMENTS

| | | | | |
|---|---|---|---|---|
| 9,678,271 | B2* | 6/2017 | Thacker | G02B 6/4219 |
| 10,996,412 | B2* | 5/2021 | Perminjat | G02B 6/43 |
| 11,069,541 | B2* | 7/2021 | Ko | H01L 23/3128 |
| 11,107,770 | B1 | 8/2021 | Ramalingam et al. | |
| 11,611,004 | B2* | 3/2023 | Amano | G02B 6/428 |
| 2016/0085038 | A1 | 3/2016 | Decker et al. | |
| 2016/0216445 | A1* | 7/2016 | Thacker | G02B 6/4219 |
| 2018/0156972 | A1 | 6/2018 | Kainuma et al. | |
| 2018/0299628 | A1 | 10/2018 | Liu et al. | |
| 2023/0161120 | A1* | 5/2023 | Yu | G02B 6/4214 385/14 |

OTHER PUBLICATIONS

Extended Search Report, EP23171617.6, dated Sep. 15, 2023, 9 pages.

* cited by examiner

*Primary Examiner* — Rhonda S Peace
(74) *Attorney, Agent, or Firm* — Quarles & Brady LLP (57) ABSTRACT

An apparatus includes a substrate that includes one or more routing layers, and an optical module coupled to the substrate. The optical module includes a photonic integrated circuit (PIC) and electronic integrated circuit (EIC), wherein the photonic integrated circuit is at least partially embedded within the substrate. The apparatus further includes a fiber optic coupler coupled to at least one of the substrate or PIC, wherein the PIC is configured to transmit or receive an optical signal via the fiber optic coupler.

20 Claims, 6 Drawing Sheets

PHOTONICS INTEGRATION IN SEMICONDUCTOR PACKAGES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for a semiconductor package including integrated photonics packaging.

BACKGROUND

On-package optics modules (OM) and fiber optic couplers (FOCs) are typically placed in a multi-chip module (MCM) configuration, and typically as an isolated module at the edge of a semiconductor package. Conventional arrangements of OMs makes integration with advanced packaging difficult, such as in 2.xD and 3D integrated circuits (IC). Moreover, conventional on-package OMs suffer from package warpage and reliability issues.

Thus, methods, systems, and apparatuses for an integrated OM and FOC are provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF EMBODIMENTS

Various embodiments set forth a semiconductor package with integrated OM, and methods of manufacturing a semiconductor package with integrated OM.

In some embodiments, an apparatus for a semiconductor package with integrated OM is provided. The apparatus includes a substrate that includes one or more routing layers, and an optical module coupled to the substrate. The optical module includes a photonic integrated circuit (PIC) and electronic integrated circuit (EIC), wherein the photonic integrated circuit is at least partially embedded within the substrate. The apparatus further includes a fiber optic coupler coupled to at least one of the substrate or PIC, wherein the PIC is configured to transmit or receive an optical signal via the fiber optic coupler.

In further embodiments, a semiconductor device with integrated OM is provided. The semiconductor device includes an interposer that includes one or more routing layers, and an optical module coupled to the substrate. The optical module includes a photonic integrated circuit (PIC) and electronic integrated circuit (EIC), wherein the EIC is coupled to the PIC via the substrate. The semiconductor device further includes a fiber optic coupler coupled to at least one of the substrate or PIC, wherein the PIC is configured to transmit or receive an optical signal via the fiber optic coupler.

In further embodiments, a method of manufacturing a semiconductor package with integrated OM is provided. The method includes coupling a photonic integrated circuit (PIC) of an optical module to a substrate, wherein the photonic integrated circuit is at least partially embedded within the substrate, coupling one or more fiber optic couplers to the substrate, wherein the fiber optic coupler is configured to allow the PIC to transmit or receive an optical signal via the fiber optic coupler, and bonding an electronic integrated circuit (EIC) of the optical module to the substrate first substrate comprising one or more first routing layers.

In the following description, for the purposes of explanation, numerous details are set forth to provide a thorough understanding of the described embodiments. It will be apparent to one skilled in the art, however, that other embodiments may be practiced without some of these details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Similarly, when an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

On-package optics are used to address bandwidth and power concerns associated with copper interconnects. Typically, on-package OMs and FOCs are placed in a MCM configuration, typically as isolated modules at the edge of the package. Conventional arrangements present challenges to 2.xD and 3DIC integration, as well as presenting warpage and reliability issues. Accordingly, embodiments in which on-package OM and FOCs are integrated within substrates and/or interposers are set forth below.

Figure 1:
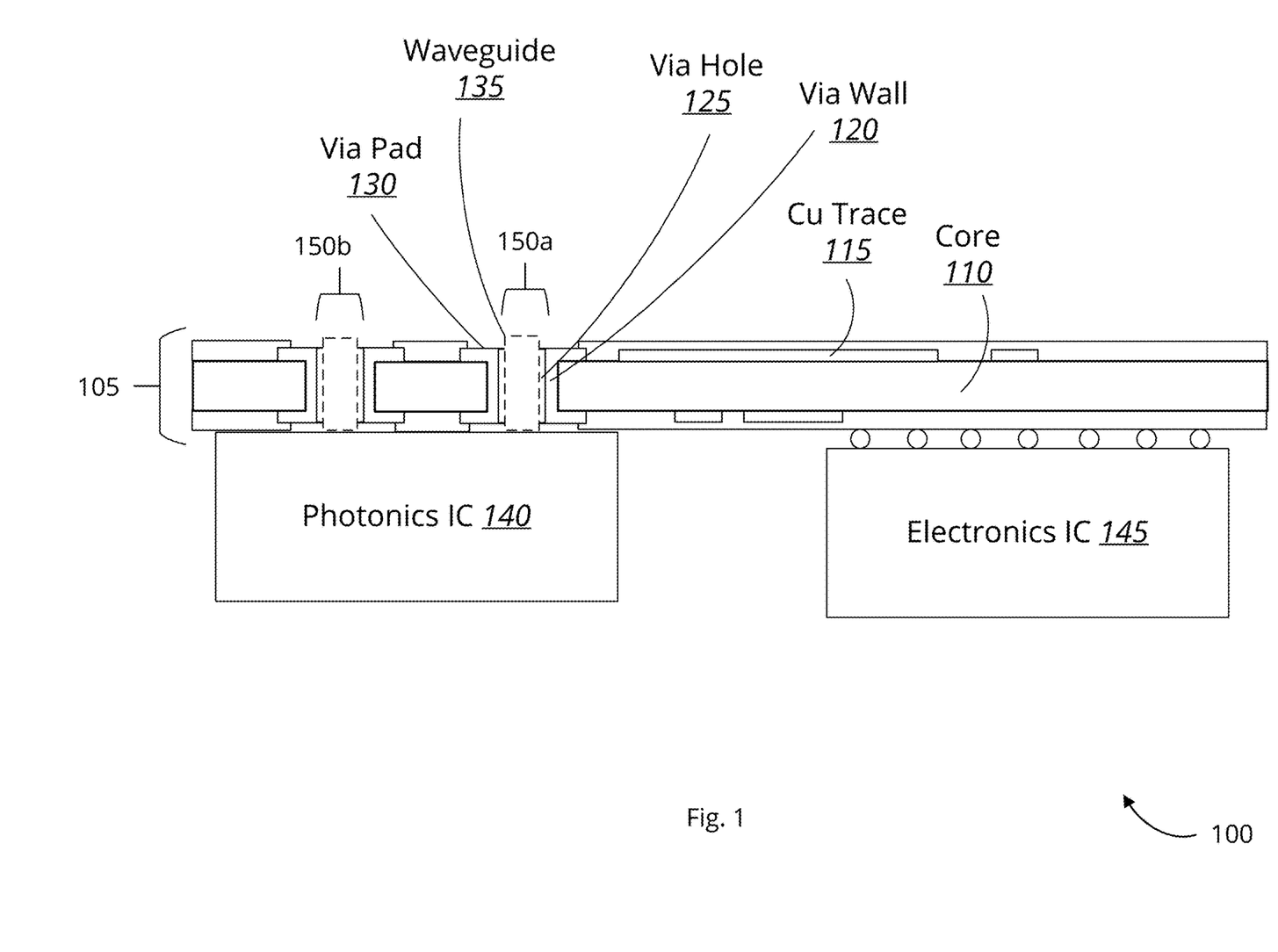
FIG. 1 is a schematic cross-sectional view of an interposer of a semiconductor package with integrated OM, in accordance with various embodiments.

FIG. 1 is a schematic cross-sectional view of 100, in accordance with various embodiments. The semiconductor package 100 includes an interposer 105, photonic integrated circuit (PIC) 140, and electronic integrated circuit (EIC) 145. It should be noted that the various components of the semiconductor package 100 are schematically illustrated in FIG. 1, and that modifications to the various components and other arrangements of semiconductor package 100 may be possible and in accordance with the various embodiments.

In various embodiments, the semiconductor package 100 includes interposer 105, which may further include core 110, copper (Cu) traces 115, and one or more through-hole vias, also referred to as "vias," 150a, 150b. Each of the vias 150a, 150b may respectively include via walls 120 defining a via hole 125, and via pads through which the vias may be electrically coupled (e.g., to other components or to Cu trace 115). Moreover, each via 150a, 150b may respectively include a waveguide 135 positioned inside via hole 125, and optically coupled to the photonics IC 140.

In various examples, the interposer 105 may be configured to couple one or more components (such as flip-chip die and passive elements) to another substrate having different and/or larger pitch connections. For example, spacing of interconnection pads of a chip may have finer pitch relative to the spacing of interconnection pads on a substrate. Thus, the interposer 105 may be configured to facilitate a connection between components and a substrate. In some examples, the interposer 105 may itself be a substrate for one or more components mounted to the interposer 105. In some examples, the interposer 105 may be silicon or other inorganic dielectric materials such as Bismaleimide Triazine (BT), FR-4 (e.g., a glass-reinforced epoxy), polyimide tape, ceramic, silicon, and/or glass. In further embodiments, the interposer 120 may be an organic interposer. Organic interposers may include interposers formed of organic and/or polymer compounds, such as, without limitation, polycyclic aromatic compounds, as known to those skilled in the art. In yet further examples, the interposer 120 may include a combination of glass, silicon, other inorganic compound, organic compound, or a combination of the above materials.

In various examples, the PIC 140 and EIC 145 may be coupled to the interposer 105. In some examples, the PIC 140 and EIC 145 may be coupled to the interposer via one or more solder bumps (e.g., Cu bumps and/or microbumps).

In further examples, components such as the PIC 140 may be coupled to the interposer 105 via an adhesive, such as an epoxy. While in the example depicted, the PIC 140 and EIC 145 are coupled to the same side of the interposer 105, it is to be understood that in other embodiments, the PIC 140 and EIC 140 may be on opposite sides of the interposer 105, and further that one or both of the PIC 140 and EIC 145 may be on the other side of the interposer 105.

In various examples, an OM may include the PIC 140 and EIC 145. The PIC 140 may include optical components of an OM, such as components for receiving and/or transmitting an optical signal (e.g., from another component or device). Accordingly, the PIC 140 may include, without limitation, a tunable laser transmitter and/or receiver (e.g., a photodetector), and supporting circuitry, such as interconnect waveguides, splitters, optical amplifiers, modulators, and filters. EIC 145 may include electronic components of the OM, such as, without limitation, control circuitry, power circuitry (e.g., electronic amplifiers), filters, converters, and/or other components for managing electrical signals of the OM.

In various embodiments, one or more vias 150a-150b may be formed in the interposer 105, such that the PIC 140 may be accessible from a top side of the interposer 105. The vias 150a-150b and/or PIC 140 may be positioned such that one or more optical signals reach the PIC 140 through the vias 150a-150b. In some examples, respective waveguides (e.g., waveguide 135) may be placed and/or formed within the respective via holes and coupled to the PIC 140. The waveguide 135 may, thus, be configured to carry optical signals to and from the PIC 140. In various examples, waveguide 135 may include, without limitation, a waveguide grating, fiber optic coupler, collimator and/or lens for directing optical signals to and from the PIC 140. The waveguide 135 may, in some examples, be an optical fiber directly coupled to the PIC 140 (in which case the PIC 140 may include an FOC to couple to the optical fiber).

In various examples, because the interposer 105 is formed to allow an optical signal to pass through vias 150a-150b, the PIC 140 and/or EIC 145 may be integrated (e.g., embedded) within a substrate (e.g., coupled to an internal layer of a substrate) and/or integrated within the interposer 105 itself.

Accordingly, in various embodiments, a though hole (vias 150a, 150b) may be created within the interposer 105 with Cu traces 115 on one or both sides of the vias 150a-150b. The EIC 145 may be located on the top or bottom of the interposer 105. The interposer 105 may further include Cu traces 115 formed on one or both sides.

Different arrangements of a semiconductor package with integrated OMs are illustrated below with respect to FIGS. 2-5.

Figure 2:
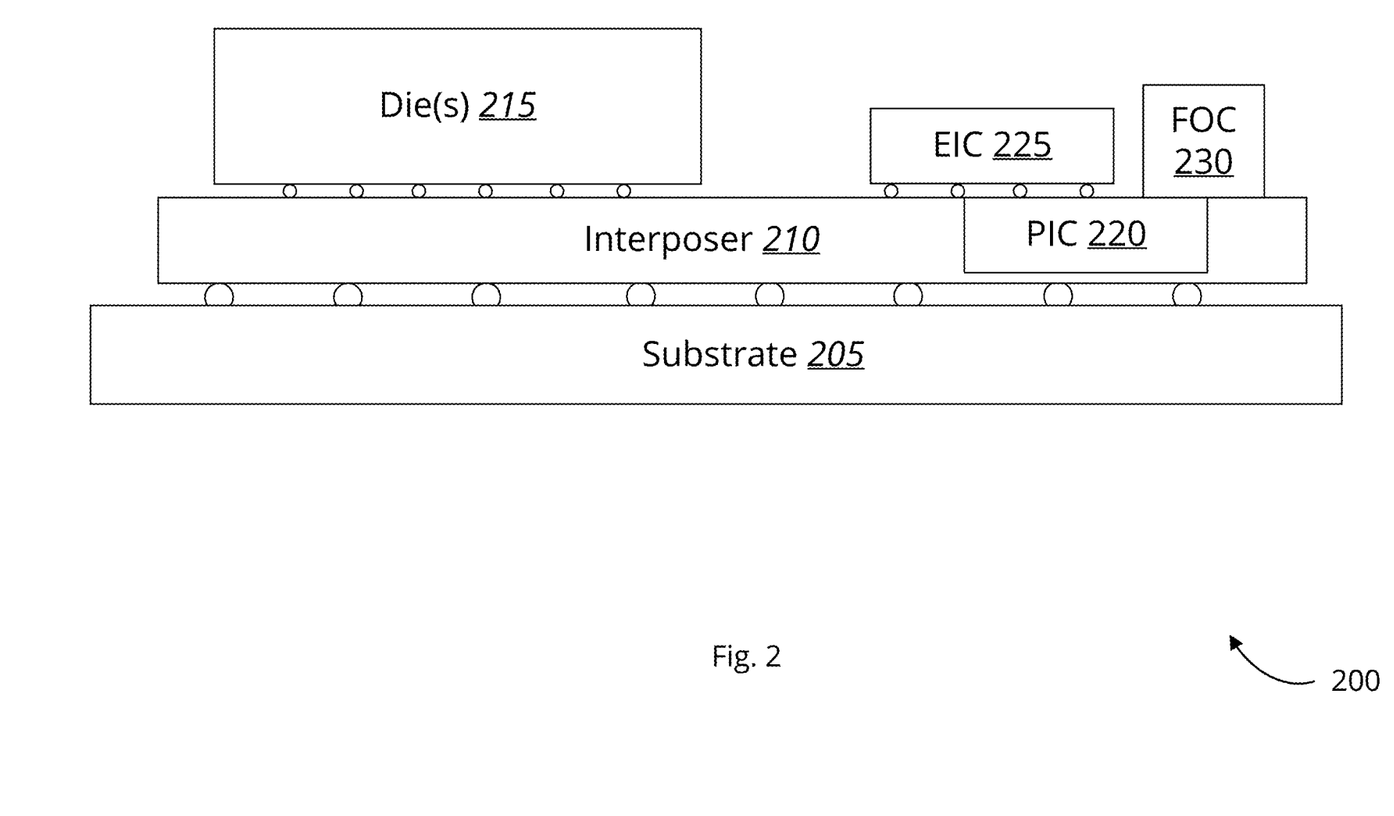
FIG. 2 is a schematic cross-sectional view of a semiconductor package with integrated OM in an interposer, in accordance with various embodiments.

FIG. 2 is a schematic cross-sectional view of a semiconductor package 200 with an integrated OM in an interposer. The semiconductor package 200 includes a substrate 205, interposer 210, one or more dies 215, PIC 220, EIC 225, and FOC 230. It should be noted that the various components of the semiconductor package 200 are schematically illustrated in FIG. 2, and that modifications to the various components and other arrangements of semiconductor package 200 may be possible and in accordance with the various embodiments.

In the embodiments depicted, the substrate 205 may be an organic flip-chip substrate, redistribution layer (RDL), or printed circuit board (PCB) having one or more internal routing layers. Routing layers may include any layer configured to provide component interconnects. For example, routing layers are layers of the substrate through which interconnections may be established between components. Connections may be routed, for example, through copper pads, copper/metal traces deposited on/in the substrate layer, and through-hole vias, or other suitable interconnects. The interposer 210, like interposer 105 of FIG. 1, may be configured to couple the one or more dies 215 and the OM (e.g., PIC 220, EIC 225, and FOC 230) to the substrate 205. In various examples, the one or more dies 215 may be coupled to the interposer 210 via a plurality of solder bumps (e.g., Cu bumps and/or microbumps), or through copper bonding (e.g., direct copper bonding and/or hybrid copper bonding).

In the examples depicted, the PIC 220 may be embedded within the interposer 210. According to various embodiments, the interposer 210 is an organic interposer, wherein the PIC 220 is embedded within the interposer 210. In some examples, the PIC 220 may be coupled to one or more internal routing layers of the interposer 210. In further examples, the PIC 220 may be exposed on one side (e.g., a top side) and coupled to EIC 225 and FOC 230. In further examples, the interposer 210 may further include one or more vias through which an optical signal may be carried to the PIC 220.

As with the one or more dies 215, the EIC 225 may be coupled to the interposer 210 and/or the PIC 220 utilizing solder bumps (e.g., Cu bumps and/or microbumps) or through copper bonding (e.g., direct copper bonding and/or hybrid copper bonding). In various examples, the FOC 230 may be arranged such that an optical fiber can be coupled to the PIC vertically (e.g., from a top side of the interposer 205) or horizontally (e.g., the fiber optic positioned parallel/coplanar with the interposer 210). In some examples, a horizontal arrangement of the optical fiber is implemented using a v-groove in the interposer 210, leading to the FOC 230, such that the optical fiber is positioned within the v-groove. In this way, by embedding PIC 220 within the interposer 205, the effects of warpage may be mitigated or altogether eliminated, and signal integrity preserved.

Figure 3:
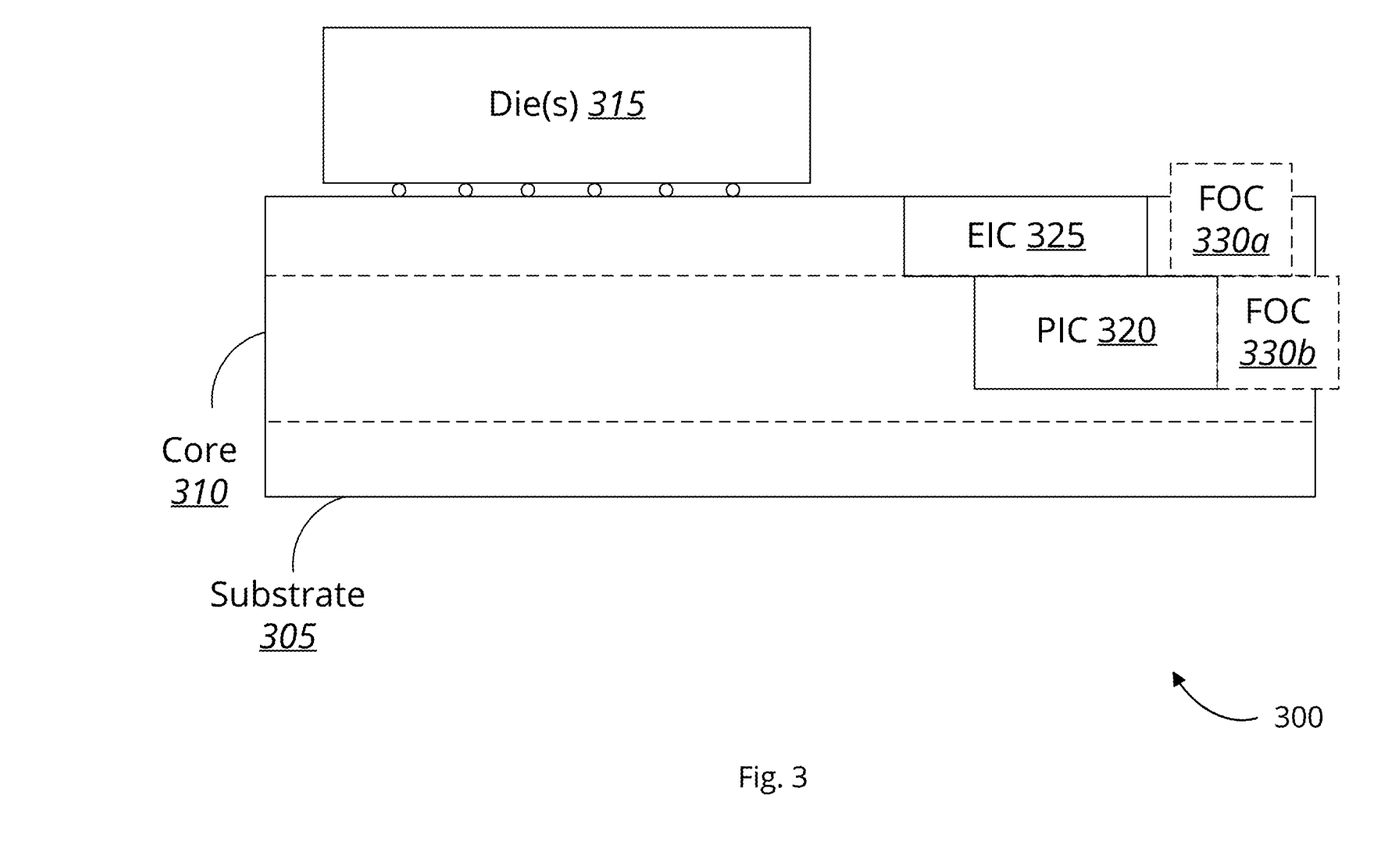
FIG. 3 is a schematic cross-sectional view of a semiconductor package with an integrated OM in a glass core substrate, in accordance with various embodiments.

FIG. 3 is a schematic cross-sectional view of a semiconductor package 300 with an integrated OM in a glass core substrate, in accordance with various embodiments. The semiconductor package 300 includes a substrate 305 having a core 310, one or more dies 315, PIC 320, EIC 325, and an FOC 330a, 330b. It should be noted that the various components of the semiconductor package 300 are schematically illustrated in FIG. 3, and that modifications to the various components and other arrangements of semiconductor package 300 may be possible and in accordance with the various embodiments.

In the example depicted, the substrate 305 may include a core 310 formed of optically transmissive glass. In further examples, the substrate 305 may itself be a glass substrate, comprising one or more layers of glass having copper (or other metal) interconnects. In some examples, like the interposer 205 of FIG. 2, the PIC 320 and/or EIC 325 may be embedded within the substrate 305. In some examples, the PIC is embedded inside a transmissive glass core 310 of the substrate 305, and configured to carry an optical signal to and/or from the PIC 320.

In various embodiments, the FOC 330a, 330b may be coupled to the core 310 via a hole (e.g., a through-hole via) or notches formed in the substrate 305, and specifically the core 310 of the substrate 305. In some examples, the FOC 330a, 330b may be placed alternatively on exposed to a top side of the substrate 305, or to a side of the substrate 305, according to whether an optical fiber is to be coupled to the FOC 330a, 330b from the top of the semiconductor package 300 or from the side of the semiconductor package 300. In yet further examples, multiple FOCs 330a, 330b may be coupled to the substrate 305, such that both FOCs 330a and 330b are available for use. In some examples, the FOCs 330a, 330b may be coupled to the PIC 320 directly, while in other examples, some of the transmissive core 310 of the substrate 305 may be present between the PIC 320 and FOCs 330a, 330b. In yet further examples, the core 310 of the substrate 305 may be formed into a waveguide and/or lens, configured to guide and optical signal, through the core 310, to the PIC 320. In yet further examples, the core 310 may include materials having a first refractory index around the PIC 320 and/or FOCs 330a, 330b, and a different refractory in areas away from the PIC 320 and/or FOCs 330a, 330b.

In various embodiments, the EIC 325 may be coupled to the PIC 320 using one or more vias in the substrate 305. For example, vias may be drilled into the glass core 310, allowing copper (or other metal) traces, pillars, and/or wires to couple the EIC 325 to the PIC 320. In this way, by embedding PIC 320 within the substrate 305, the effects of warpage may be mitigated or altogether eliminated, and signal integrity preserved.

Figure 4:
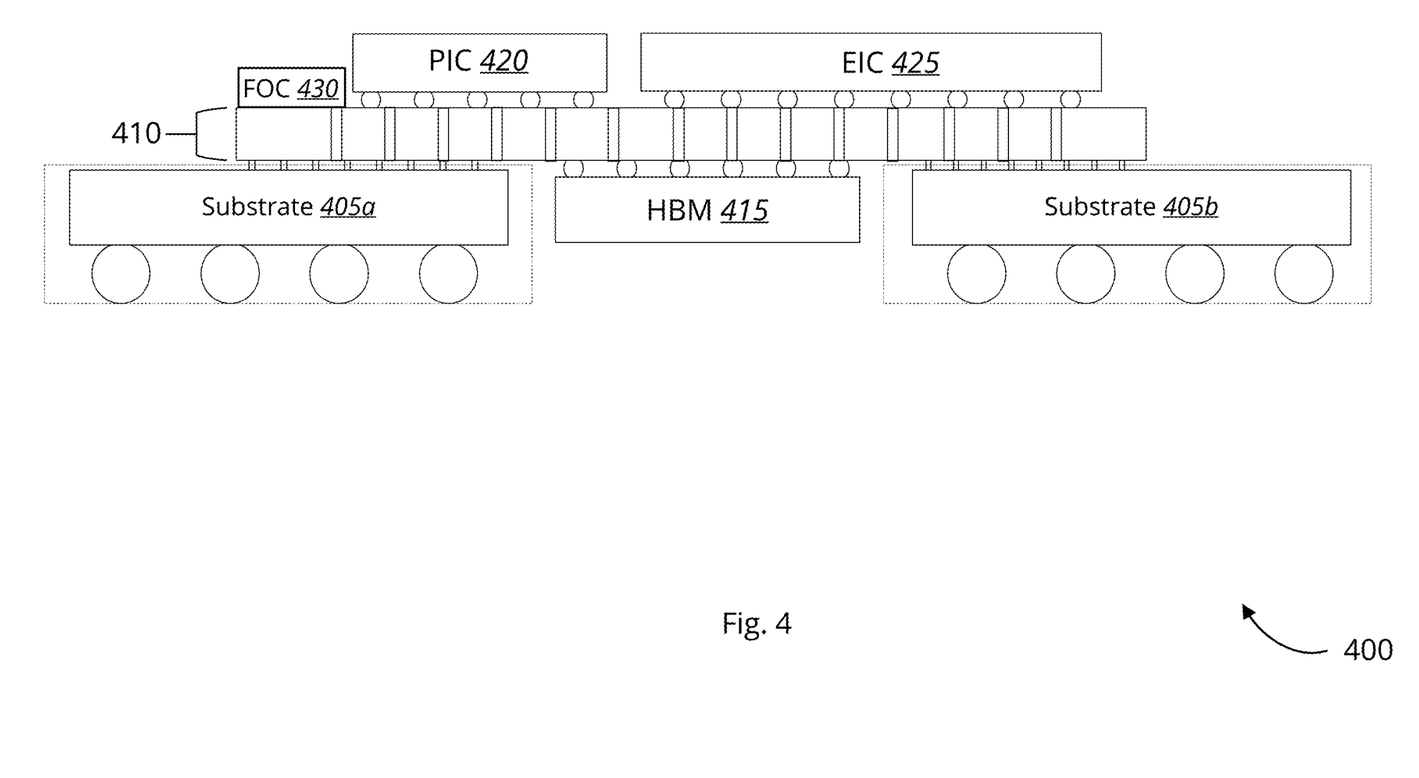
FIG. 4 is a schematic cross-sectional view of a semiconductor package with integrated OM having a separated photonic integrated circuit and electronic integrated circuit, in accordance with various embodiments.
Figure 5:
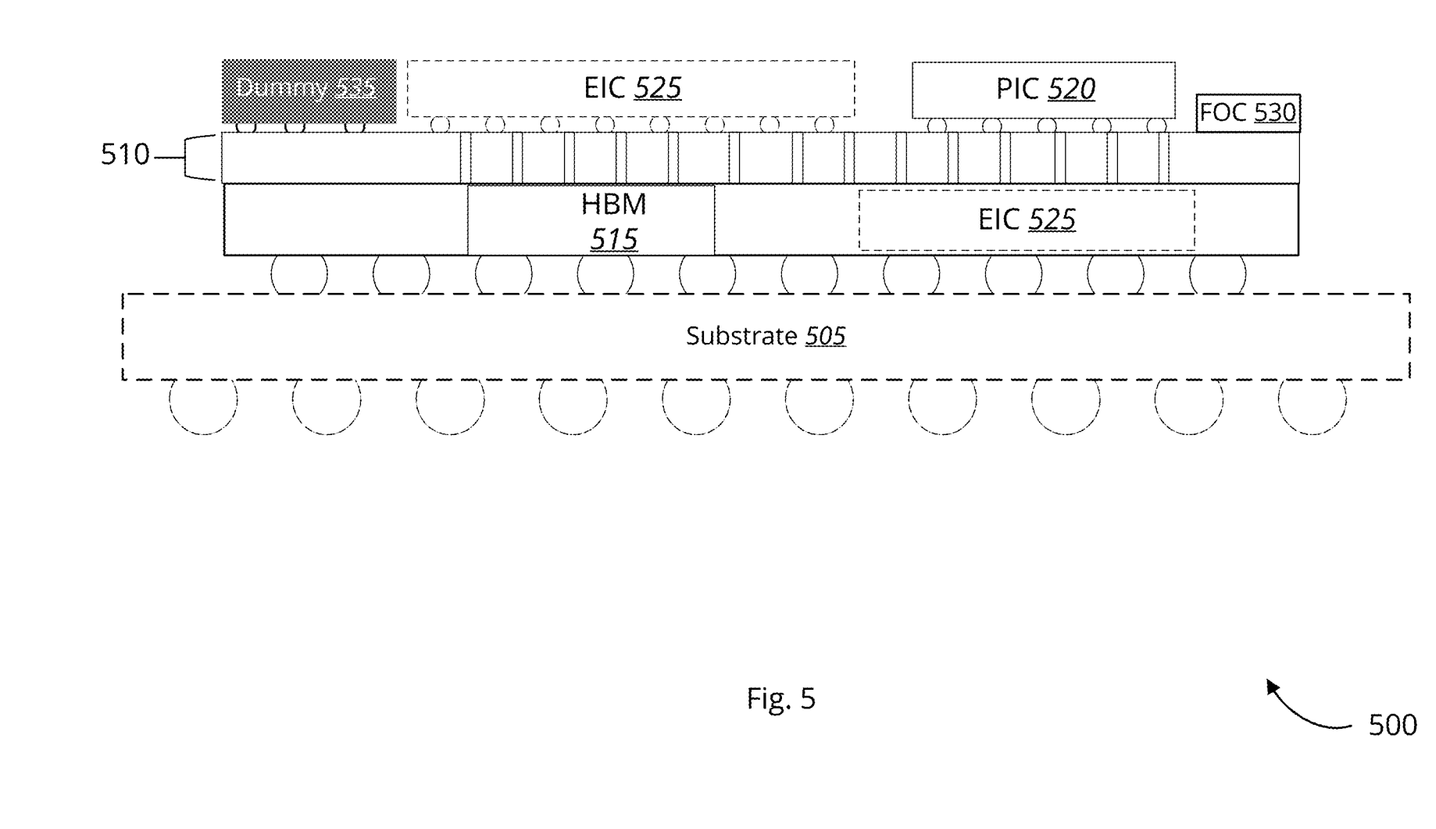
FIG. 5 is a schematic cross-sectional view of an alternative arrangement of a semiconductor package with integrated OM having a separated photonic integrated circuit and electronic integrated circuit, in accordance with various embodiments.

FIGS. 4 & 5 provide examples of an integrated OM in which the PIC and EIC are separated, providing additional flexibility in component placement on the semiconductor package.

FIG. 4 is a schematic cross-sectional view of a semiconductor package 400 with an integrated OM having a separated photonic integrated circuit and electronic integrated circuit, in accordance with various embodiments. The semiconductor package 400 includes substrates 405a, 405b, interposer 410, high-bandwidth memory (HBM) 415, PIC 420, EIC 425, and FOC 430. It should be noted that the various components of the semiconductor package 400 are schematically illustrated in FIG. 4, and that modifications to the various components and other arrangements of semiconductor package 400 may be possible and in accordance with the various embodiments.

In the embodiments, depicted, the PIC 420, EIC 425, and FOC 430 are coupled to a top side of the interposer 410. HBM 415 is coupled to a bottom side of the interposer 410. As previously described, the PIC 420, EIC 425, FOC 430, and HBM 415 may be coupled to the interposer 410 using a variety of techniques, and is not limited to any one technique. For example, in some embodiments, one or more of the PIC 420, EIC 425, FOC 430, and HBM 415 may be coupled to the interposer 410 utilizing solder bumps (e.g., Cu bumps and/or microbumps). In further examples, one or more of the PIC 420, EIC 425, FOC 430, and HBM 415 may be coupled to the interposer 410 through copper bonding (e.g., hybrid copper bonding and/or direct copper bonding). In yet further examples, modules like the PIC 420 and/or FOC 430 may be coupled to the interposer 410 via adhesive, molding, or other bonding techniques.

The interposer 410 may further be coupled to substrate(s) 405a, 405b. In the example depicted, the substrate may be split into two substrates, with the interposer 410 bridging electrical connections between the two substrates 405a, 405b. In yet further embodiments, the semiconductor package 400 may not include substrate(s) 405a, 405b, and instead be formed on mold (e.g., an epoxy molding compound (EMC)), or in some examples, a dummy silicon or glass carrier. Accordingly, in some embodiments, a chip on wafer (CoW) process may be utilized to bond the OM, and specifically the PIC 420, EIC 425, interposer 410, and HBM 415, directly to a glass or silicon carrier. This is in contrast with traditional organic flip-chip substrates.

In various examples, the PIC 420 and EIC 425 are not stacked (e.g., the PIC 420 and EIC 425 are not directly bonded), and instead are separated on the same side of the interposer 410, similar to the arrangement shown in the package 100 of FIG. 1. Here, the interposer 410 may be configured to provide an electrical interconnect (e.g., a connection through one or more copper traces through one or more routing layers) between the PIC 420 and EIC 425, as opposed to an optical interconnect with an FOC 430. Thus, floor planning and other mechanical constraints on the placement of the PIC 420, EIC 425, and/or FOC 430 are avoided.

In various examples, the FOC 430 may be configured to couple an optical fiber to the PIC 430. The FOC 430 may include, without limitation, optical fiber array couplers, silicon photonics couplers (e.g., a grating coupler), and other suitable optical couplers, as known to those skilled in the art. In various examples, FOC 430 may be bonded to one or more of the PIC 420 and/or interposer 410 via adhesive bonding using an epoxy.

FIG. 5 of an alternative arrangement of a semiconductor package 500 with integrated OM having a separated photonic integrated circuit and electronic integrated circuit, in accordance with various embodiments. The semiconductor package 500 includes a substrate 505, interposer 510, high-bandwidth memory (HBM) 515, PIC 520, EIC 525, FOC 530, and dummy die 535. It should be noted that the various components of the semiconductor package 500 are schematically illustrated in FIG. 5, and that modifications to the various components and other arrangements of semiconductor package 500 may be possible and in accordance with the various embodiments.

Like the semiconductor package 400, semiconductor package 500 includes an OM in which the PIC 520 and EIC 525 are separated. In contrast with semiconductor package 400, however, the PIC 520 and EIC 525 may be located on opposite sides of the interposer 510 or on the same side of the interposer 510. Like the interposer 410 of FIG. 4, the interposer 510 may similarly be an electrical interconnect between the PIC 520 and EIC 525, thus eliminating the need for PIC 520 and EIC 525 to be bonded. FOC 530 may be coupled to the interposer 510 and/or PIC 520 and configured couple an optical fiber to the PIC 520, as previously described.

In various examples, the interposer 510 may further be coupled to substrate 505. As previously described with respect to FIG. 4, in some examples, the semiconductor package 500 may not include a substrate 505, and instead may be formed on mold (e.g., an epoxy molding compound (EMC)), or a dummy silicon or glass carrier, using a CoW process.

Figure 6:
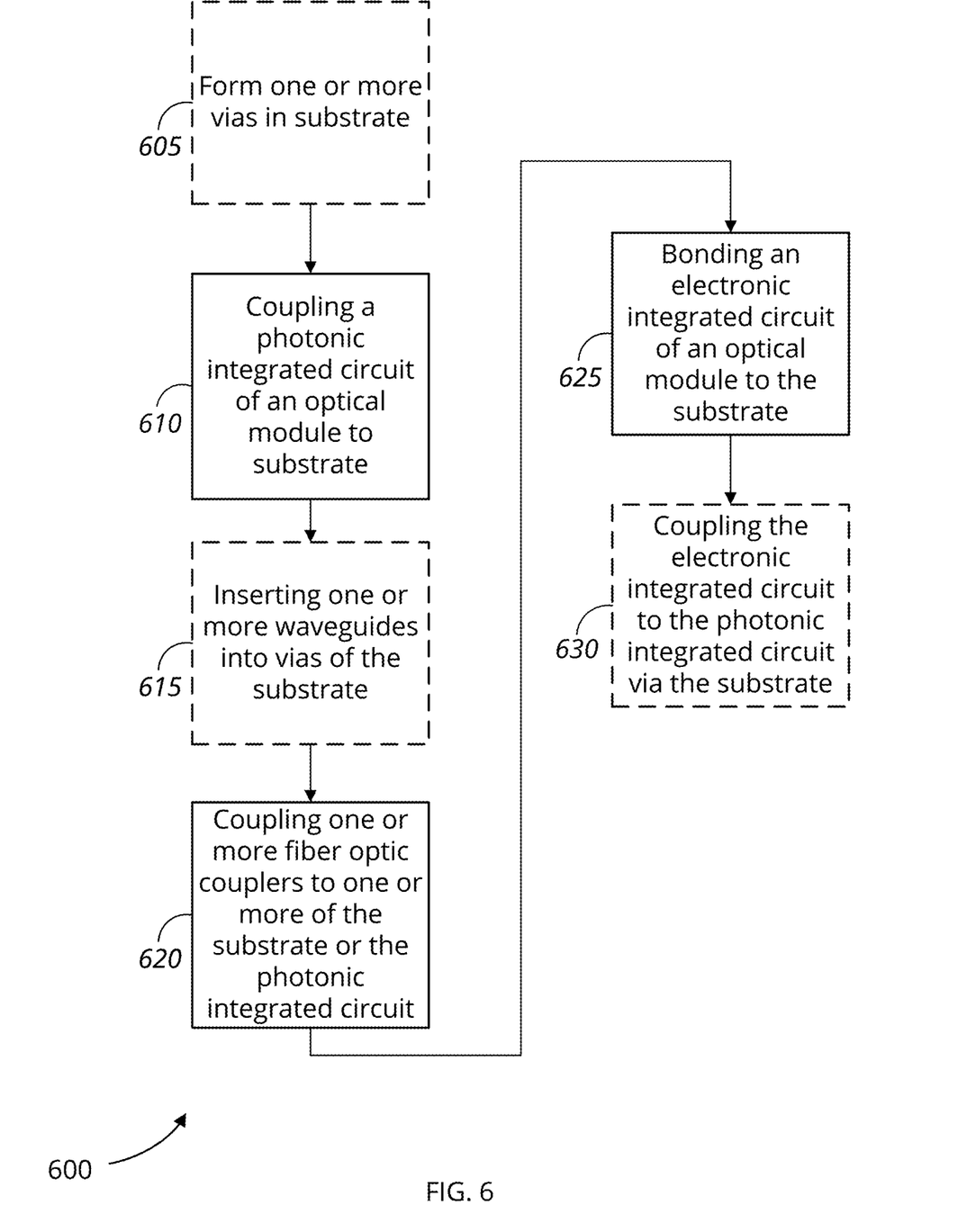
FIG. 6 is a method of manufacturing a semiconductor package with an integrated OM.

FIG. 6 is a flow diagram of a method 600 of manufacturing a semiconductor package with an integrated OM, in accordance with various embodiments. The method 600 may begin, at block 605, by forming one or more vias in a substrate. As previously described, in some examples, the substrate may be an interposer, glass and/or silicon substrate, an organic flip-chip die substrate, RDL, PCB substrate, or other suitable substrate as known to those skilled in the art. In various examples, one or more through-hole vias may be formed in the substrate. Forming the vias may include, without limitation, various manufacturing processes, including, without limitation, drilling (e.g., laser ablation) or other suitable techniques.

The method 600 continues, at block 610, by coupling a photonic integrated circuit of an optical module within the substrate. In various examples, coupling a PIC to the substrate may include bonding the PIC to the substrate. In some examples, the photonic integrated circuit may be embedded within the substrate. Embedding within the substrate includes, without limitation, bonding the PIC to an internal layer of the substrate. In further examples, a notch may be formed in the substrate, and the PIC bonded to the substrate within the notch. In further examples, the PIC is mounted to a top surface of the substrate. Bonding of the PIC may include, without limitation, bonding via solder bumps (e.g., Cu bumps and/or microbumps), copper bonding (e.g., hybrid copper bonding and/or direct copper bonding), and bonding via adhesive (e.g., epoxy).

At block 615, the method 600 further includes inserting one or more waveguides into the one or more vias of the substrate. As previously described, the waveguides may include, without limitation, at least part of an FOC, optical fiber, lens, grating, or other suitable optical waveguide.

At block 620, the method 600 continues by coupling the one or more fiber optic couplers to one or more of the substrate or the PIC. As previously described, in some examples, the substrate itself may be transmissive (e.g., glass), and thus the FOC may be bonded directly to the substrate, which may be configured to carry an optical signal between the FOC and the PIC. In further examples, the FOC may be coupled to the substrate via the one or more waveguides of the substrate. In yet further examples, the FOC may be coupled to the PIC (e.g., through a respective interface of the PIC).

The method 600 continues, at block 625, by bonding an EIC of the OM to the substrate. The EIC, like the PIC, may be bonded to a surface of the substrate (e.g., a top surface or bottom surface) or embedded within the substrate, such as to an internal layer of the substrate. In yet further examples, the EIC may be bonded, at least partially, to the PIC. As previously described, bonding of the EIC may include, without limitation, bonding via solder bumps (e.g., Cu bumps and/or microbumps), copper bonding (e.g., hybrid copper bonding and/or direct copper bonding), and bonding via adhesive (e.g., epoxy).

At block 630, the method 600 may further include coupling the EIC to the PIC via the substrate. As previously described, in some embodiments, the substrate includes one or more copper (or other metal) interconnects that electrically couple components that are coupled to the substrate. Thus, the substrate may be configured to be an electrical interconnect for the EIC and PIC. In some examples, the substrate may be an interposer electrically coupling the EIC to the PIC, and further each of the EIC and PIC to an additional substrate, such as a PCB, RDL, or other suitable substrate.

The techniques and processes described above with respect to various embodiments may be used to manufacture the semiconductor packages 100, 200, 300, 400, 500, and/or components thereof, as described herein.

While some features and aspects have been described with respect to the embodiments, one skilled in the art will recognize that numerous modifications are possible. For example, the methods and processes described herein may be implemented using hardware components, custom integrated circuits (ICs), programmable logic, and/or any combination thereof. Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. An apparatus comprising:
    a substrate comprising a first side and a second side, the substrate comprising a first layer, a core layer, and a second layer, the first layer being positioned on the first side, the second layer being positioned on the second side, and the core layer being positioned between the first layer and the second layer;
    an optical module coupled to the substrate, the optical module comprising a photonic integrated circuit (PIC) and electronic integrated circuit (EIC), wherein the PIC is at least partially embedded within the core layer; and
    a fiber optic coupler coupled to at least one of the substrate or PIC, wherein the PIC is configured to transmit or receive an optical signal via the fiber optic coupler.

2. The apparatus of claim 1, wherein the substrate is an interposer.

3. The apparatus of claim 2, wherein the interposer is an organic interposer.

4. The apparatus of claim 2, wherein the interposer comprises a v-groove, and the fiber optic coupler is positioned within the v-groove.

5. The apparatus of claim 1, wherein the substrate is an optically transmissive substrate.

6. The apparatus of claim 5, wherein the substrate is one of silicon or glass.

7. The apparatus of claim 1, wherein the substrate comprises a glass core, wherein the PIC is embedded in the glass core.

8. The apparatus of claim 1, wherein the PIC is bonded to a notch in the substrate.

9. The apparatus of claim 1, wherein the EIC is at least partially bonded to the PIC.

10. The apparatus of claim 1, wherein the EIC coupled to the substrate, wherein the EIC is coupled to the PIC via the substrate.

11. The apparatus of claim 1, wherein the EIC is at least partially embedded within the substrate.

12. The apparatus of claim 1, wherein the core layer comprises a first area around the PIC or the EIC and a second area away from the PIC and EIC, the first area comprises a first material characterized by a first refractory index, the second area comprises a second material characterized by a second refractory index, and the first refractory index is different from the second refractory index.

13. A semiconductor device comprising:
    a substrate comprising an interposer, the interposer comprising a first side and a second side, the substrate comprising a first layer, a core layer, and a second layer, the first layer being positioned on the first side, the second layer being positioned on the second side, and the core layer being positioned between the first layer and the second layer;
    an optical module coupled to the substrate, the optical module comprising a photonic integrated circuit (PIC) and electronic integrated circuit (EIC), wherein the EIC is coupled to the PIC via the substrate, and the PIC is embedded within the core layer; and
    a fiber optic coupler coupled to at least one of the substrate or PIC, wherein the PIC is configured to transmit or receive an optical signal via the fiber optic coupler.

14. The semiconductor device of claim 13, wherein the PIC is at least partially embedded within the interposer.

15. The semiconductor device of claim 13, wherein the PIC is bonded to a notch in the substrate.

16. The semiconductor device of claim 13, wherein the EIC is at least partially bonded to the PIC.

17. The semiconductor device of claim 13, wherein the PIC is bonded to a first side of the substrate, wherein the EIC is bonded to a second side of the substrate, wherein the second side is opposite of the first side.

18. The semiconductor device of claim 13, further a substrate, wherein the interposer is further coupled to the substrate.

19. The semiconductor device of claim 13, wherein the substrate further comprises one or more through-hole vias, wherein each of the one or more vias comprising at least part of a respective waveguide, wherein each respective waveguide is in optical communication with the PIC.

20. A method comprising:
    coupling a photonic integrated circuit (PIC) of an optical module to a substrate, wherein the substrate comprises a first side and a second side, the substrate comprises a first layer, a core layer, and a second layer, the first layer is positioned on the first side, the second layer is positioned on the second side, and the core layer is positioned between the first layer and the second layer, the photonic integrated circuit is at least partially embedded within the core layer;
    coupling one or more fiber optic couplers to the substrate, wherein the fiber optic coupler is configured to allow the PIC to transmit or receive an optical signal via the fiber optic coupler; and
    bonding an electronic integrated circuit (EIC) of the optical module to the substrate, the substrate comprising one or more first routing layers.

* * * * *